United States Patent

Braat

Patent Number: 5,734,511
Date of Patent: Mar. 31, 1998

[54] WIDE ANGLE OBJECTIVE SYSTEM

[75] Inventor: Josephus J. M. Braat, Eindhoven, Netherlands

[73] Assignee: U.S. Philips Corporation, New York, N.Y.

[21] Appl. No.: 408,756

[22] Filed: Mar. 22, 1995

[30] Foreign Application Priority Data

Jul. 25, 1994 [EP] European Pat. Off. ............. 94202161

[51] Int. Cl.$^6$ .................. G02B 13/18; G02B 7/02; G02B 9/12; G02B 13/04

[52] U.S. Cl. .................. 359/716; 359/753; 359/784; 359/820

[58] Field of Search .................. 359/716, 661, 359/784, 820, 713, 714, 715, 749, 750, 751, 752, 753

[56] References Cited

U.S. PATENT DOCUMENTS

| | | | |
|---|---|---|---|
| 4,855,987 | 8/1989 | Versluis | 369/112 |
| 5,175,650 | 12/1992 | Takayama et al. | 359/714 |
| 5,198,931 | 3/1993 | Igarashi | 359/770 |
| 5,223,982 | 6/1993 | Suzuki et al. | 59/784 |
| 5,251,073 | 10/1993 | Schauss | 359/715 |
| 5,296,971 | 3/1994 | Mori | 359/716 |
| 5,353,164 | 10/1994 | Sasian-Avarado | 359/784 |
| 5,418,649 | 5/1995 | Igarashi | 359/716 |
| 5,436,767 | 7/1995 | Suzuki et al. | 359/784 |

FOREIGN PATENT DOCUMENTS

| | | | |
|---|---|---|---|
| 0091618 | 5/1986 | Japan | 359/716 |
| 4107407 | 4/1992 | Japan | . |
| 404276711 | 10/1992 | Japan | 359/784 |

*Primary Examiner*—Scott J. Sugarman
*Attorney, Agent, or Firm*—Walter M. Egbert, III

[57] ABSTRACT

A wide angle objective system is described for, inter alia CCD cameras, which system is compact, inexpensive and satisfactorily corrected. It comprises a front meniscus lens ($L_1$), a thick convex-concave central lens element ($L_2$) and a biconvex lens element ($L_3$), the two last-mentioned elements preferably being cemented together, the pupil (P) being present at the area of the exit surface (4) of the second lens element and the first and the third element ($L_1$,$L_3$) being made of, for example PMMA and the second element ($L_2$) being made of, for example PC.

18 Claims, 2 Drawing Sheets

GEOMETRICAL MTF-CURVES

N.A.    X      Y        FREQ(1/MM)
0.225   0.00000   1.95620      12.5
VIGNETTING(%): 29

WIDE ANGLE OBJECTIVE SYSTEM

The invention relates to an objective system having a large angular aperture for demagnified imaging a scene in an image plane, which system, viewed from the object side, successively comprises:

a first lens element having a first and a second convex refractive surface, a second lens element having a third, convex refractive surface and a fourth refractive surface, a third lens element having a fifth refractive surface and a sixth refractive surface.

The invention also relates to an image pick-up device provided with such an objective system.

BACKGROUND OF THE INVENTION

Such an objective system having, however, an extremely large angular aperture ranging between 125° and 150°, which can be used in a CCD camera, is described in U.S. Pat. No. 5,251,073. This system is of the retrofocus type, which is also referred to as inverse telephoto type, which means that it has a relatively large front focal length at the image side. The known objective system has an F number of F/2.0 and comprises at least four and preferably six glass lens elements. In the known system, the entrance pupil between the first and the second lens element is located in air.

The objective system of the present invention is intended for mass application and for combination with, for example an electronic image sensor, or CCD sensor, having a photosensitive surface diagonal of, for example 4 mm. If the objective system is inexpensive enough, such a combination may be used in a monitoring camera, in a videophone or in a camera which is associated with a personal computer working station coupled to other such stations, so that visual data can be transmitted together with the actual data from one station to other stations. These data can be obtained by scanning a document, also referred to as bitmapping. For said applications, the objective system should have a field of view of the order of 2×35° or more, a focal length of, for example 3 mm dependent on the surface of the image sensor for a CCD image sensor having a diagonal of 2 mm and an F number of, for example F/2.5 so as to pick up scenes of sufficient quality, even at low light levels. Such an objective system cannot be made in accordance with the design described in U.S. Pat. No. 5,251,073 because it would then be too expensive. Moreover, this system has a resolving power which is too small and exhibits too much spherical aberration and astigmatism, the latter effect being particularly troublesome in said bitmapping application.

SUMMARY OF THE INVENTION

It is an object of the present invention to provide an objective system for, inter alia said application, which system is inexpensive and compact, has a satisfactory colour correction and little astigmatism and distortion, and a satisfactory resolving power. This objective system is characterized in that the sixth refractive surface is concave, in that the pupil of the lens system is present at the area of, or very proximate to the fourth refractive surface, and in that the first and the third lens element are manufactured from the same first material having a first refractive index, and the second lens element is manufactured from a second material having a second refractive index which is different from the first refractive index.

At the area of the fourth surface the angles of incidence of the imaging beam, which angles are determined by the first and second lens elements, are considerably reduced as compared with those of the beam incident on the first lens surface. Since the transition of the second lens element having the second refractive index to the third lens element having the first refractive index is present at the location of the pupil, which transition has a correcting effect for the longitudinal colour error, this error is satisfactorily corrected for all angles of incidence of the imaging beam. Such an effective correction is not realised in the objective system in accordance with U.S. Pat. No. 5,251,073, in which the pupil is not present at the location of, or very proximate to a correction element. The longitudinal colour error is understood to mean that the position of the image plane is dependent on the colour, or wavelength, of the beam or the beam components.

By making use of a thick second lens element having the second refractive index, the transversal colour error of the first lens element having the first refractive index is corrected. The transversal colour error is understood to mean the colour, or wavelength-dependent magnification of the objective system.

The first and third lens elements may be separated from each other by a narrow air gap. An embodiment of the objective system, which is preferred from a manufacturing-technical point of view and as regards stability, is, however, characterized in that the fourth and the fifth refractive surface have the same curvature and are cemented together.

Use is made of a cementing material whose refractive index is in the range between a value which is slightly larger than the smallest of said first and second refractive indices and a value which is slightly larger than the largest of said refractive indices.

This embodiment is preferably further characterized in that it satisfies the conditions $$0.20 \leq \frac{K_+}{K_{tot}} \leq 0.60$$

in which $K_+$ is the positive focal power of the assembly of the second and the third lens element and $K_{tot}$ is the total focal power of the lens system.

An inexpensive embodiment of the objective system having a satisfactory quality is characterized in that the lens elements are entirely manufactured of a synthetic material.

Since all lens elements consist of a transparent synthetic material, the objective system is inexpensive, while it still has the imaging quality desired for said applications. Moreover, lens elements made of such synthetic materials can easily be provided with aspherical surfaces by making use of aspherically profiled moulds for manufacturing the lens elements.

It is to be noted that an objective system for use in a CCD camera and consisting of synthetic material elements is known per se from the abstract of Japanese Patent Application 4-107407. However, this system comprises only two lens elements, a negative meniscus lens and a biconvex lens, in which the meniscus lens does not have an aspherical surface. The abstract neither states that the materials of the lens elements are different. The quality of this objective system cannot match that of the objective system according to the present invention, not only in the field but also on the axis.

A preferred embodiment of the objective system using synthetic material elements is characterized in that the first and the third lens element are manufactured of polymethyl methacrylate and the second lens element is manufactured of polycarbonate. Practice has proved that these materials having a refractive index of 1.49 and 1.58, respectively, are materials having a good optical quality.

In this embodiment the fourth and the fifth lens surface are convex, as viewed from the object side.

The objective system is preferably further characterized in that the fourth lens surface is aspherical.

An aspherical lens surface is understood to mean a surface whose fundamental shape is spherical but whose real shape deviates to a slight extent so as to correct for the spherical aberrations of the fundamental shape of the lens. Since the aspherical surface is present at the location of, or proximate to the pupil of the lens system, it can satisfactorily correct for all angles of incidence of the imaging beam. Since the fourth surface also ensures the correction of the longitudinal colour error, this surface thus has a double correction function in the relevant lens system.

If the objective system is further characterized in that at least one of the first and the second lens surface is aspherical, this system is satisfactorily free from distortion.

By giving also the sixth refractive surface an aspherical shape, an objective system is obtained which has a large F number of the order of F/2.5 with sufficiently small spherical aberrations.

The invention also relates to an image pick-up device provided with an objective system and an opto-electronic image sensor for converting images formed by the objective system into an electronic image signal. This image pick-up device is characterized in that the objective system is a system as described hereinbefore.

If this image pick-up device is further characterized in that the image sensor is a CCD sensor, this device can be implemented in a compact and inexpensive way.

The synthetic materials, abbreviated to PMMA and PC, have a greater temperature sensitivity than glass. To minimize the effect of this temperature sensitivity and those of the holder accommodating the lens elements on the supplied image signal, the image pick-up device may be further characterized in that the sensor is provided with a fitting for accomodating a lens holder in which the lens elements of the objective system are secured and in that the thermal coefficient of expansion of said fitting is larger than that of the lens holder.

BRIEF DESCRIPTION OF THE DRAWING FIGURES

These and other aspects of the invention will be apparent from and elucidated with reference to the embodiments described hereinafter.

In the drawings

DESCRIPTION OF THE INVENTION

Figure 1:
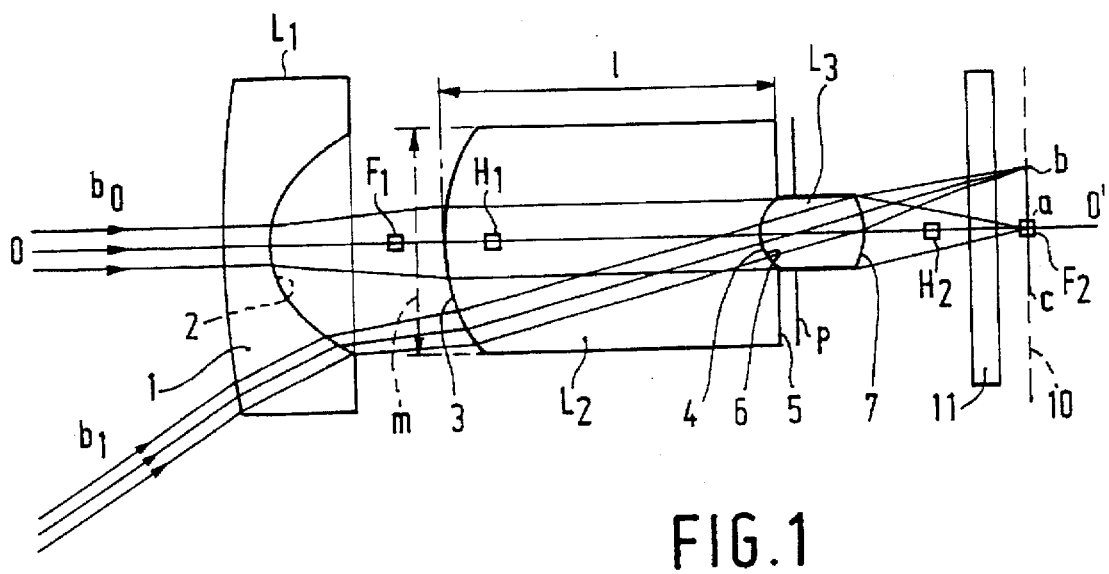
FIG. 1 shows an embodiment of the objective system according to the invention.

The objective system shown in a cross-section in FIG. 1 comprises a first lens element $L_1$, a second lens element $L_2$ and a third lens element $L_3$. The scene to be imaged is at the left-hand side in FIG. 1 and the image plane 10 is at the right-hand side. The first lens element has the shape of a meniscus lens having a slightly curved exit surface 2. This element ensures that a beam portion $b_0$ entering along the optical axis $00'$ becomes divergent and that a peripheral beam portion $b_1$ entering at a relatively large angle $\alpha$ is deflected in such a way that it will extend more parallel to the optical axis and becomes divergent. The lens element $L_2$ has an entrance surface 3 with such a radius of curvature that it has a collimating effect so that all beam portions can be combined on the exit surface 4 which has a smaller diameter and a smaller radius of curvature than the entrance surface 3. The surface portions 5 at both sides of the exit surface 4 of the lens element $L_2$ may be plane. The exit surface 4 itself has a diverging effect which is overcompensated by the third lens element so that the beam portions $b_0$ and $b_1$ are focused at the points a and b of the image plane 10. All beam portions incident under the optical axis $00'$ at angles between 0° and $\alpha°$ are focused at points located between the points a and b. The peripheral beam portion incident above the optical axis at an angle $-\alpha$ is focused at a point c in the image plane which is symmetrical with respect to the point b. The beam portions which are incident above the optical axis at angles between 0° and $-\alpha°$ are focused at points between said point c and point a. The third lens element has an entrance surface 6 and an opposite curved exit surface 7. The surface 4 of element $L_2$ is preferably cemented against surface 6 of element $L_3$. However, these surfaces may also be separated by a narrow air gap.

In FIG. 1, the references $H_1$ and $H_2$ denote the main planes of the objective system, $F_2$ denotes the image focal point and p denotes the exit pupil. For the sake of completeness, a glass plate 11 is also shown which may be located in front of a sensor and which should be taken into account in designing the objective system.

The refractive indices of the lens element materials, the curvatures of these elements and the distances between these surfaces are preferably chosen to be such that it holds for the focal powers that:

$$0.20 \leq \frac{K_+}{K_{tot}} \leq 0.60$$

in which $K_+$ is the positive power of the assembly of element $L_2$ and element $L_3$, and $K_{tot}$ is the total power of the objective system.

To be able to keep the price of the objective system as low as possible, the lens elements are preferably manufactured of a synthetic material. The first and the third lens element $L_1$ and $L_3$ are manufactured of the same transparent synthetic material, preferably polymethyl methacrylate (PMMA) having a refractive index $n_1=1.49$, while the second lens element is manufactured of a different synthetic material having a different refractive index, for example polycarbonate (PC) having a refractive index $n_2=1.58$. With this choice of synthetic materials, surface 4 is concave and surface 6 is convex, as is shown in FIG. 1. With a different choice of synthetic materials, may become convex and surface 6 may become concave. Instead of PMMA, another similar polymer may be used and instead of PC, for example styrene or the material CA-39. The second lens element is a thick element, i.e. its length l is considerably larger than the diameter m of its first lens surface 3. With this element of, for example PC the transversal colour error of the negative front element $L_1$ of, for example PMMA can be corrected. Moreover, the longitudinal colour error is corrected at the transition between the refractive surface 4 of the lens element $L_2$ and the refractive surface 6 of the lens element $L_3$, hence at an internal refractive surface.

This internal refractive surface is present in or proximate to the pupil of the objective system, hence at a position where the axes of the different beam portions extend at small angles to the optical axis OO' of the system, so that this correction for these beam portions is equally satisfactory.

The surface 4 is preferably aspherical so that at the location of the pupil it is also possible to correct for the aspherical aberration, which correction is again substantially identical for all beam portions. The surface 4 then has a dual correcting effect. An aspherical surface may be characterized by $$Z = \Sigma A_{2i} \cdot Y^{2i}$$

in which Y is the distance between a point on the aspherical surface and the optical axis of the lens element, Z is the distance between the projection on the optical axis of this point and the point of intersection of the optical axis with the aspherical surface and $A_{2i}$ are the aspherical coefficients.

By giving the surface 2 or surface 1 an aspherical shape, the distortion of the objective system can be maintained sufficiently small. By giving also the surface 7 an aspherical shape, the spherical aberration of the system can even be better corrected so that the system is sufficiently free from spherical aberration, also for the relatively large F number: $F_{2.5}$.

For an embodiment of the objective system in accordance with FIG. 1, having three aspherical surfaces in which the lens elements $L_1$ and $L_3$ are made of PMMA and the lens element $L_2$ is made of PC, the following values, computed from the object side, apply for the axial surface curvatures $C_1$, the axial distances d between these surfaces and the refractive indices n:

|  |  | c (mm$^{-1}$) | d(mm) | n |
|---|---|---|---|---|
| $L_1$ | 1 | 0.03078 |  |  |
|  |  |  | 1.5 | 1.49 |
|  | 2 | 0.33483 |  |  |
|  |  |  | 5.346 | 1 |
| $L_2$ | 3 | 0.17400 |  |  |
|  |  |  | 10.055 | 1.58 |
| $L_3$ | 4/6 | 0.49336 |  |  |
|  |  |  | 3.2118 | 1.49 |
|  | 7 | −0.46157 |  |  | while the aspherical coefficients $A_{2i}$ of the surfaces 2, 4 and 7 are equal to:

1. $A_2 = 0.167446 \cdot 10^0$
   $A_4 = 0.410699 \cdot 10^{-2}$
   $A_6 = -0.361459 \cdot 10^{-3}$
   $A_8 = 0.332931 \cdot 10^{-4}$
   $A_{10} = -0.942326 \cdot 10^{-6}$
4. $A_2 = 0.246681 \cdot 10^0$
   $A_4 = 0.163018 \cdot 10^0$
   $A_6 = -0283456 \cdot 10^{-1}$
   $A_8 = 0.332336 \cdot 10^{-1}$
7. $A_2 = -0.230787 \cdot 10^0$
   $A_4 = -0.904503 \cdot 10^{-2}$
   $A_6 = 0.433596 \cdot 10^{-2}$
   $A_8 = -0.444410 \cdot 10^{-2}$
   $A_{10} = -0.841075 \cdot 10^{-3}$ If a glass plate 11 having a thickness of 0.19 mm and a refractive index of 1.51 is arranged between the lens surface 7 and the image plane 10, the image field is located at a distance of 5.3132 mm from this lens surface.

This objective system has a focal length of 3 mm, an image diagonal of 4.02 mm, an F number $F_{2.5}$, a field of view of 2×38° and a resolving power of more than 50% for a structure of 40 lines/mm. The system is satisfactorily corrected for colour in a wavelength band between 500 and 900 nm.

Figure 4:
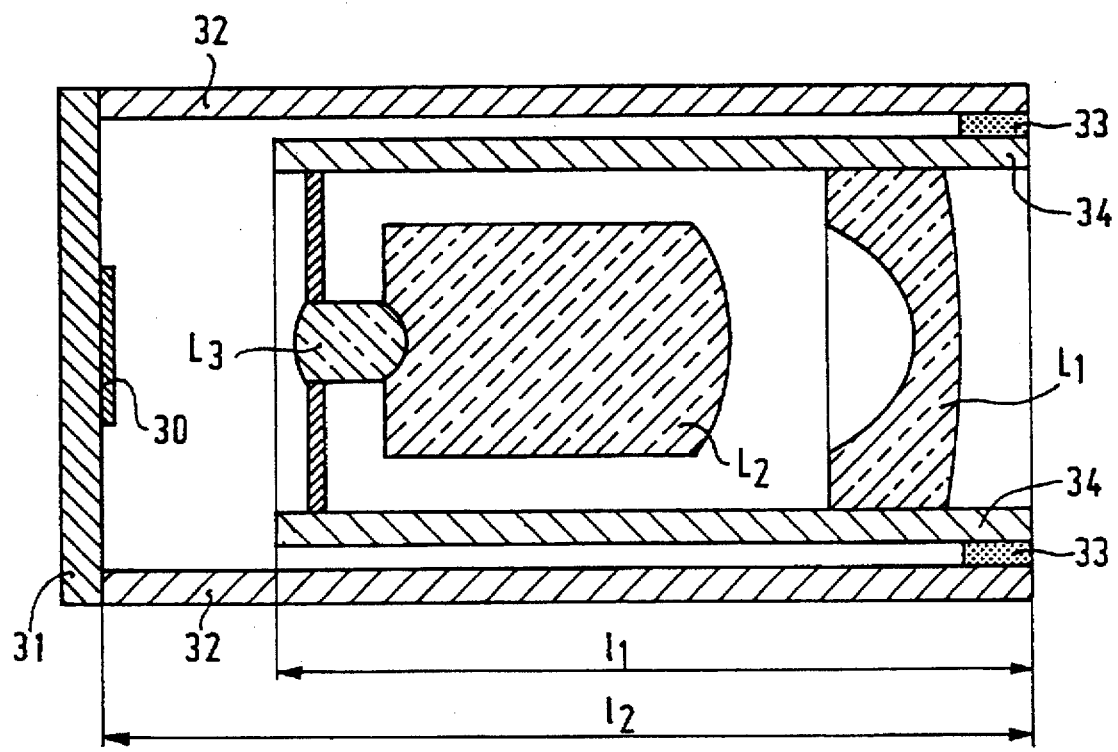
FIG. 4 shows an image pick-up device provided with such an objective system.

FIG. 4 shows diagrammatically an embodiment of an image pick-up device according to the invention which comprises the above-described objective system and an image sensor 30, preferably in the form of a CCD sensor as its basic elements.

The objective system has a total power of $K_{tot} = 0.333$ mm$^{-1}$, the power of the lens element $L_1$ K being 0.16 mm$^{-1}$ and the power of the assembly of the lens elements $L_2$, $L_3$: $K_+$ being 0.13 mm$^{-1}$.

Figure 2A:
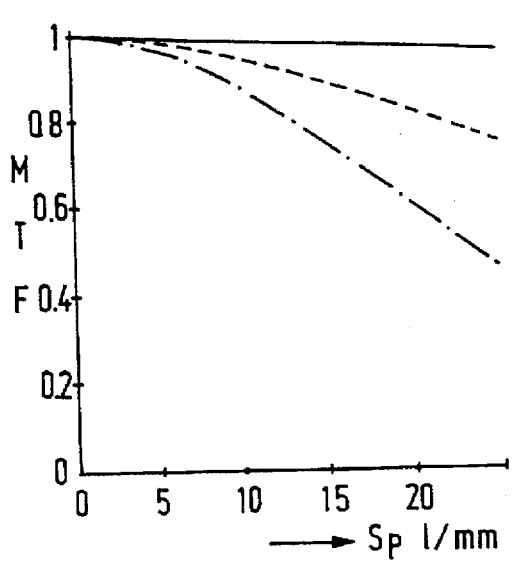
FIGS. 2a and 2b show the modulation transfer curve and an aberration curve of this system.
Figure 2B:
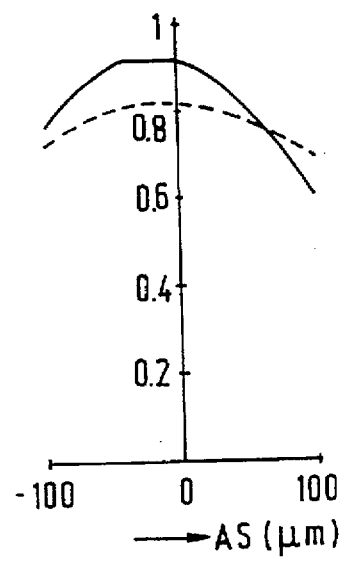

FIG. 2a shows the modulation transfer function (MTF) of this embodiment of the objective system as a function of the spatial frequency SP (expressed in lines per mm) while FIG. 2b shows the MTF as a function of the distance AS to the optical axis for a spatial frequency of 12.5 lines per mm. It appears that the astigmatism is only small and that the MTF is 50% for a spatial frequency of 40 lines per mm.

Figure 3:
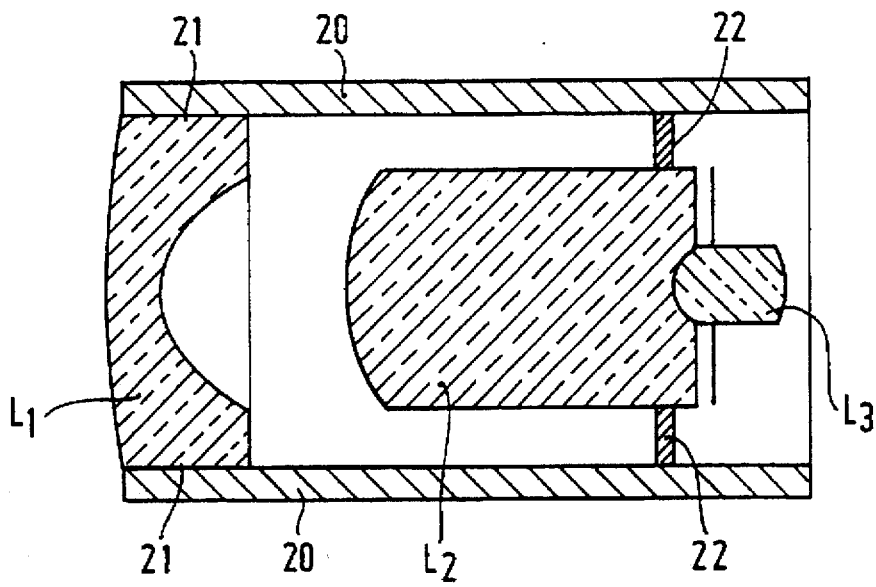
FIG. 3 shows this system accommodated in a holder.

In practice, the separate lens elements are accommodated in a common holder 20, as is shown in FIG. 3.

The synthetic materials preferably used for the lens elements $L_1$, $L_2$ and $L_3$ have a larger thermal coefficient of expansion than glass. Moreover, their refractive index is temperature-dependent. Consequently, the optical behavior of the objective system might change when the ambient temperature varies so that the scene would be imaged out of focus on the image sensor. To prevent this, a material having such a thermal coefficient of expansion may be chosen for the lens holder 20 that the equivalent coefficient of expansion of the objective system causing the change of optical behaviour of this system as a function of the temperature and being determined by:

the coefficients of expansion of the materials of the lens elements, the refractive indices of these materials and their variations with temperature, and the dimensions of the lens elements is equal to the coefficient of expansion of the holder material which is present between the fixations 21, 22 on the holder of the two outer elements of the objective system.

This provides a compensation for temperature variations in the objective system itself. For the principle and further elaboration of this temperature compensation, reference is made to U.S. Pat. No. 4,855,987 in which a temperature-compensated radiation source unit and an optical scanning unit are described.

FIG. 4 shows diagrammatically an embodiment of an image pick-up device according to the invention, which comprises the above-described objective system and an image sensor 30, preferably in the form of a CCD sensor as its basic elements. This sensor is arranged on a holder 31. To be able to correct for temperature variations, a bush 32 may be secured to the holder 31 as an alternative to the compensation described with reference to FIG. 3. This bush is connected at the points 33 to an inner bush 34 within which the lens system $L_1$, $L_2$, $L_3$ is arranged. The thermal coefficient of expansion $\alpha_1$ of the bush 32 is larger than that, $\alpha_2$, of the bush 33. If the length of the bush 32 is $l_1$ and that of the bush 34 is $l_2$, an offset $\Delta Z$ of the objective system with respect to the sensor 30 will occur at a temperature variation of $\Delta T$, which offset is given by $$\Delta z = (l_1 \alpha_1 - l_2 \alpha_2) \Delta T$$

This offset can correct the offset of the focal point of the objective system occurring as a result of the temperature variation $\Delta T$.

I claim:

1. An objective system having a large angular aperture for demagnified imaging a scene in an image plane, which system, viewed from the object side, successively comprises:

a first lens element having a first convex surface and a second concave surface, a second lens element having a third convex surface and a fourth refractive surface, a third lens element having a fifth refractive surface and a sixth convex surface, a pupil of the lens system being positioned proximate the fourth refractive surface, and wherein the first and the third lens element are manufactured from a first material having a first refractive index, and the second lens element is manufactured from a second material having a second refractive index different from the first refractive index.

2. An objective system as claimed in claim 1, wherein the fourth and the fifth refractive surface have the same curvature and are cemented together.

3. An objective system as claimed in claim 2, satisfying the conditions $$0.20 \leq \frac{K_+}{K_{tot}} \leq 0.60$$

in which $K_+$ is the positive focal power of the assembly of the second and third lens element and $K_{tot}$ is the total focal power of the lens system.

4. An objective as claimed in claim 3, wherein the lens elements are entirely manufactured of a synthetic material.

5. An objective system as claimed in claim 4, wherein the first and the third lens elements are manufactured of polymethyl methacrylate and the second lens element is manufactured of polycarbonate.

6. An objective system as claimed in claim 5, wherein the fourth lens surface is aspherical.

7. An objective system as claimed in claim 6, wherein at least one of the first and the second lens surface is aspherical.

8. An objective system as claimed in claim 7, wherein the sixth lens surface is aspherical.

9. An objective system as claimed in claim 1, and including a holder for accommodating the lens elements, the lens holder being manufactured of a material having a thermal coefficient of expansion so that the equivalent coefficient of expansion of the lens system causes a change of optical behavior of said lens system as a function of the temperature and being determined by:

the coefficients of expansion of the materials of the lens elements, the refractive indices of said materials and their variations with temperature, and the dimensions of the lens elements is equal to the coefficient of expansion of the holder material which is present between the fixations on the holder of the two outer lens elements.

10. An image pickup device provided with an objective system as claimed in claim 1 and an opto-electronic image sensor for converting images of a scene formed by the objective system into an electronic image signal.

11. An image pick-up device as claimed in claim 10, wherein the image sensor is a CCD sensor.

12. An image pick-up device as claimed in claim 10, wherein the sensor is provided with a fitting for accommodating a lens holder in which the lens elements of the objective system are secured and in that the thermal coefficient of expansion of said fitting is larger than that of the lens holder.

13. An objective as claimed in claim 1, wherein the lens elements are entirely manufactured of a synthetic material.

14. An objective system as claimed in claim 13, wherein the first and the third lens elements are manufactured of polymethyl methacrylate and the second lens element is manufactured of polycarbonate.

15. An objective system as claimed in claim 1, wherein the fourth lens surface is aspherical.

16. An objective system as claimed in claim 15, wherein at least one of the first and the second lens surface is aspherical.

17. An objective system as claimed in claim 16, wherein the sixth lens surface is aspherical.

18. An objective system as claimed in claim 1, wherein the pupil is located intermediate the fourth and the sixth refractive surfaces.

* * * * *